United States Patent
Garis

(10) Patent No.: US 9,938,734 B1
(45) Date of Patent: Apr. 10, 2018

(54) TREE STAND ASSEMBLIES AND METHODS OF USE

(71) Applicant: Matthew A Garis, Enid, OK (US)

(72) Inventor: Matthew A Garis, Enid, OK (US)

(*) Notice: Subject to any disclaimer, the term of this patent is extended or adjusted under 35 U.S.C. 154(b) by 0 days.

(21) Appl. No.: 14/988,711

(22) Filed: Jan. 5, 2016

Related U.S. Application Data

(60) Provisional application No. 62/100,131, filed on Jan. 6, 2015, provisional application No. 62/121,420, filed on Feb. 26, 2015.

(51) Int. Cl.
 *A01M 31/02* (2006.01)
 *E04G 5/06* (2006.01)
 *A45F 3/26* (2006.01)

(52) U.S. Cl.
 CPC ............. *E04G 5/067* (2013.01); *A01M 31/02* (2013.01); *A45F 3/26* (2013.01); *E04G 2005/068* (2013.01)

(58) Field of Classification Search
 CPC .................................................... A01M 31/02
 See application file for complete search history.

(56) References Cited

U.S. PATENT DOCUMENTS

| | | | | |
|---|---|---|---|---|
| 5,848,666 | A * | 12/1998 | Woodall | A45F 3/26 182/187 |
| 6,336,520 | B1 * | 1/2002 | Amacker | A01M 31/02 182/135 |
| 6,367,585 | B1 * | 4/2002 | Fast | A01M 31/02 182/135 |
| 6,571,916 | B1 * | 6/2003 | Swanson | A01M 31/02 108/152 |
| 7,926,775 | B1 * | 4/2011 | Milazzo | A01M 31/02 248/230.8 |
| 8,230,972 | B2 * | 7/2012 | Johnson | A01M 31/02 182/187 |
| 8,708,592 | B1 * | 4/2014 | Gardner | F16M 11/2057 182/187 |
| 2008/0169156 | A1 * | 7/2008 | Leishman | A01M 31/02 182/187 |
| 2010/0314514 | A1 * | 12/2010 | Nelson | F16M 11/08 248/219.1 |
| 2011/0226553 | A1 * | 9/2011 | Ekes, II | A01M 31/02 182/188 |

OTHER PUBLICATIONS https://www.facebook.com/SwiveLimb-172442489448000/.
http://www.sportsmansguide.com/product/index/swivelimb-tree-stand?a=1581473.

* cited by examiner

Primary Examiner — Alvin C Chin-Shue
(74) Attorney, Agent, or Firm — John M. Behles

(57) ABSTRACT

Tree stand apparatuses are provided herein. An example tree stand assembly includes an anchor brace that is configured to interface with a portion of a tree, a rotating and pivoting assembly having a rotating sub-assembly and a pivoting sub-assembly, as well as a seat assembly. The rotating and pivoting assembly is configured to allow the seat assembly to be positioned level to a ground surface regardless of an orientation of the rotating and pivoting sub-assembly relative to the ground surface.

11 Claims, 14 Drawing Sheets

TREE STAND ASSEMBLIES AND METHODS OF USE

CROSS REFERENCE TO RELATED APPLICATIONS

This application claims the benefit and priority of U.S. Provisional Application 62/100,131, filed on Jan. 6, 2015. This application also claims the benefit and priority of U.S. Provisional Application 62/121,420, filed on Feb. 26, 2015. All of these applications are hereby incorporated by reference herein in their entireties, including all references and appendices cited therein.

FIELD OF TECHNOLOGY

The present disclosure is generally directed to a tree stand, and more specifically, but not by limitation, to tree stands that are selectively adjustable for use on horizontal tree branches as well as vertical tree branches, as well as tree branches having angles between horizontal and vertical. A seat of the tree stand can be positioned level to the ground surface regardless of the angle of the tree branch to which the tree stand is coupled.

SUMMARY

According to some embodiments, the present disclosure is directed to a tree stand apparatus, comprising: (a) an anchor brace that is configured to interface with a portion of a tree; (b) a rotating and pivoting assembly comprising: (i) a rotating sub-assembly comprising: (1) a back plate mounted to a front surface of the anchor brace; and (2) a front plate rotationally supported by the back plate; (ii) a pivoting sub-assembly comprising: (1) a pivot plate extending normally from a front surface of the front plate; (2) a seat coupler that is pivotally connected to the pivot plate; and (3) wherein the pivoting sub-assembly rotates based on the rotation of the front plate relative to the back plate; and (c) a seat assembly that is coupled to the seat coupler.

According to some embodiments, the present disclosure is directed to a tree stand apparatus, comprising: (a) a rotating and pivoting assembly comprising: (i) a back plate mounted to a front surface of the anchor brace; and (ii) a front plate rotationally supported by the back plate; (iii) a pair of pivot plates extending normally from a front surface of the front plate; and (iv) a seat that is pivotally connected to the pair of pivot plates; (b) means for coupling the rotating and pivoting assembly to a tree; and (c) wherein the rotating and pivoting assembly is configured to allow the seat to be positioned level to a ground surface regardless of an orientation of the means for coupling the rotating and pivoting assembly relative to the ground surface.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In general, the present disclosure provides tree stand devices that can be utilized to dispose a seat or platform for standing in a level manner with a ground surface regardless of an angle of a branch or tree trunk onto which the tree stand devices are mounted. In some embodiments, the tree stand devices are configured to receive an articulating arm for holding a camera or other device, as well as a ladder or other attachment.

In some embodiments, the present disclosure is directed to a tree stand, and more specifically, but not by limitation, to tree stands that are selectively adjustable for use on horizontal tree branches as well as vertical tree branches, as well as tree branches having angles between horizontal and vertical. In some embodiments, the tree stand is a lightweight device that can be placed into a folded configuration and carried on the back of a user with the use of straps.

According to some embodiments, an example tree stand assembly can include a means for interfacing with a tree section. An example means includes an anchor brace such as a section of U-shaped channel. The channel section includes flanges that are manufactured with gripping profiles that are configured to embed within an outer surface of a tree section, such as the bark of a tree trunk or tree branch.

The channel can be secured to the tree section with cinching or ratcheting straps that further embed the flanges into the tree outer surface. The channel can include apertures or other means for coupling with the straps that secure the channel to the tree section.

The assembly can also include a rotating and pivoting assembly. A rotating sub-assembly can include a circular back plate mounted to a front surface of the anchor brace. The rotating sub-assembly can also include a front plate that is rotationally supported by the back plate.

Coupled with the rotating sub-assembly is a pivoting sub-assembly that includes one or more pivot plates. The one or more pivot plates can extend normally from a front surface of the front plate. The pivoting sub-assembly rotates based on the rotation of the front plate relative to the back plate.

The assembly can also comprise a seat coupler that is pivotally connected to the pivot plate. A seat assembly or platform can be pivotally positioned relative to the channel described above using the seat coupler. In one embodiment, the seat coupler mounts or couples with a brace of the seat assembly. The brace will also couple with the seat and/or platform, in some embodiments.

These and other advantages of the present disclosure are described below with reference to the collective drawings (e.g., FIGS. 1-8).

Figure 1:
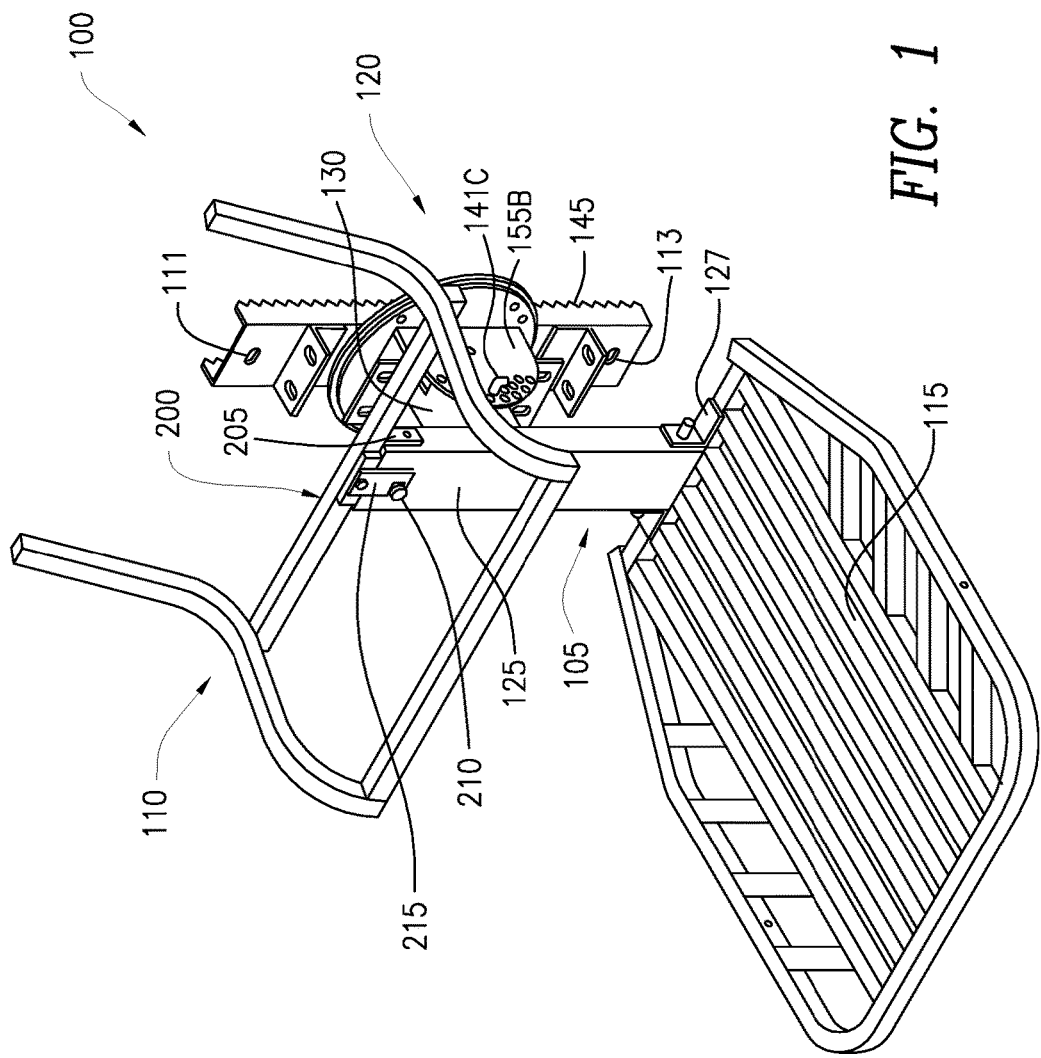
FIG. 1 is a perspective view of an example tree stand device, constructed in accordance with the present disclosure, the tree stand device being in a deployed configuration.
Figure 2A:
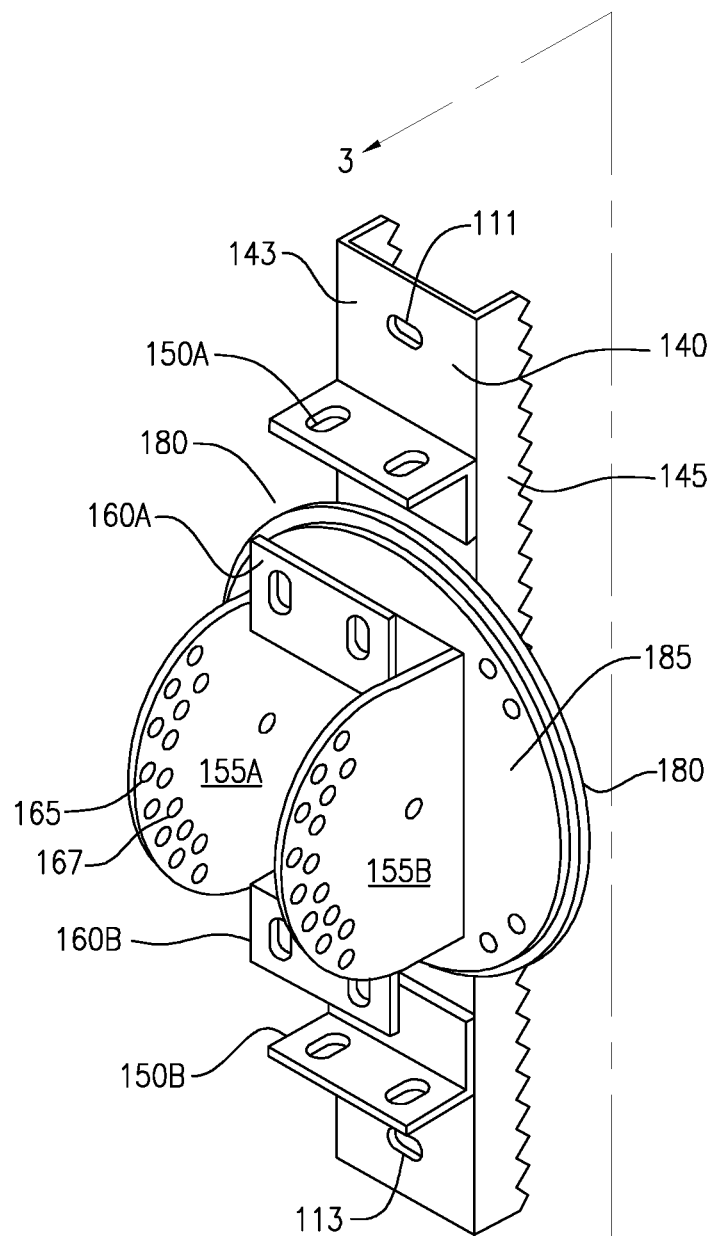
FIG. 2A is an perspective view of an example rotating and pivoting assembly for use in accordance with the present disclosure.
Figure 2B:
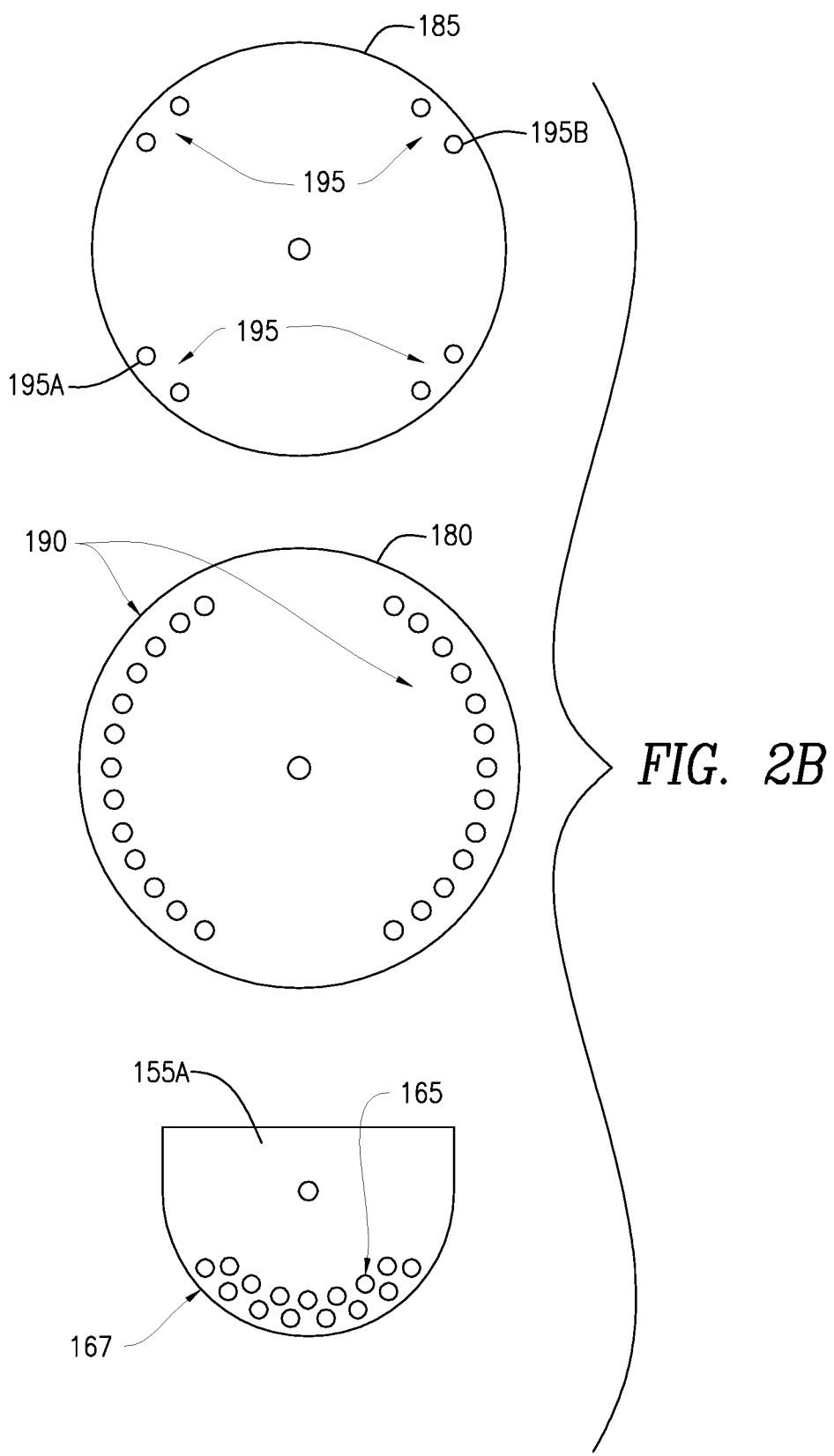
FIG. 2B is a front elevation view of a front plate, a back plate, and one of a pair of pivot plates of a rotating sub-assembly of the rotating and pivoting assembly.
Figure 2C:
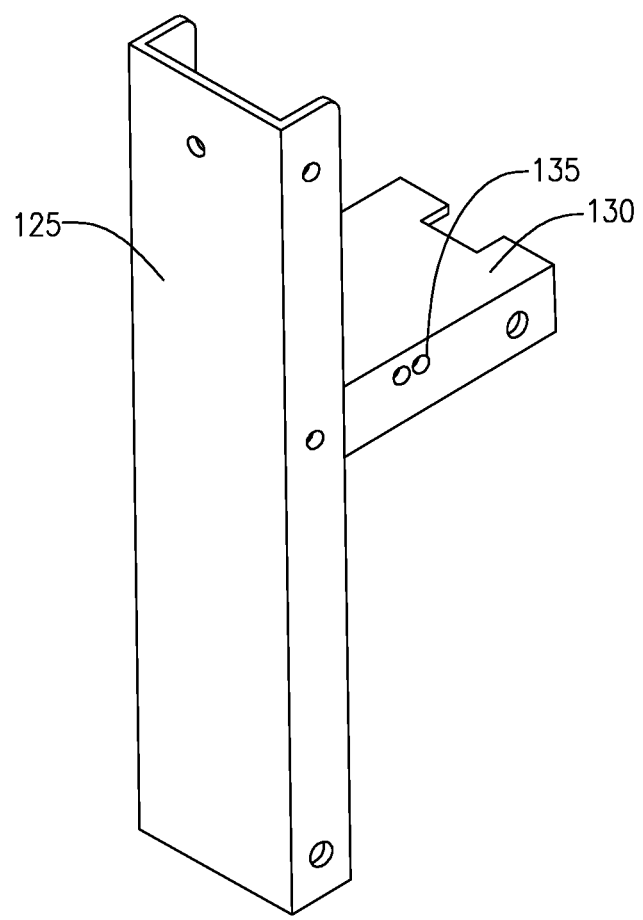
FIG. 2C is a perspective view of a brace member in combination with a pivot arm.

FIGS. 1-2C collectively illustrate an example tree stand 100 that comprises a frame 105, a seat 110, a foot stand 115, and a tree interface 120. The frame 105 comprises a brace member 125 that interfaces with the seat 110 at a first terminal end and the foot stand 115 at an opposing terminal end. The seat 110 is illustrated in FIG. 1 with seat material removed to allow for viewing of the components of the example tree stand 100.

In one embodiment, the foot stand 115 is pivotally connected to the brace member 125 using pinned L-shaped brackets 127. Other means for pivotally connecting the foot stand 115 with the brace member 125 are likewise contemplated for use.

As illustrated in FIG. 2C, the frame 105 comprises a pivot arm (also referred to as a seat coupler) 130 that extends from the brace member 125. In one embodiment, the pivot arm 130 extends perpendicularly from the brace member 125. The pivot arm 130 is configured to interface with a pair of pivot plates 155A and 155B of the tree interface 120.

The pivot arm 130 comprises apertures 135 (alignment apertures) that align with apertures in the pair of pivot plates 155A and 155B of the tree interface 120, as will be described in greater detail infra.

Attached to the anchor brace 140 are two strap brackets 150A and 150B, which are configured to receive straps, such as strap 153 and strap 154 (see FIG. 3), that secure the tree stand 100 to the tree, when in use. One strap bracket 150A is positioned above a pair of pivot plates 155A and 155B and another strap bracket 150B is position below the pair of pivot plates 155A and 155B. Each of the strap brackets has apertures that are perpendicular to the anchor brace 140. A second set of strap brackets 160A and 160B are positioned above and below the pair of pivot plates 155A and 155B but their apertures are positioned parallel with the anchor brace 140. A strap (not shown) can be used with one of the second set of strap brackets 160A and 160B to bear some of the force created by the weight of the tree stand 100 and a user seated thereon. As will be discussed in greater detail below, the pair of pivot plates 155A and 155B will receive a pivot arm of a seat assembly (described in greater detail below) so as to allow the seat assembly to be positioned at an angle relative to the anchor brace 140. For example, when the anchor brace 140 is horizontal to the ground, the pair of pivot plates 155A and 155B will be substantially perpendicular to the anchor brace 140, allowing the seat assembly to be positioned level to the ground surface G. A strap associated with the upper of the second set of strap brackets 160 will be used to bear weight of the tree stand 100 and/or a user seated or standing on the tree stand 100.

In some embodiments, the strap utilized herein can include, for example, a bungee cord with hooks received through the strap brackets or a ratcheting strap, or other similar straps that would be known to one of ordinary skill in the art.

In FIGS. 2A and 2B, the pair of pivot plates 155A and 155B each comprises a semi-circular plate with first and second rows of pin apertures such as rows 165 and 167 of pivot plate 155A, respectively. The first and second rows 165 and 167 are offset from one another to provide numerous positioning angles for the tree stand 100.

The tree interface 120 also comprises a pair of mating plates 180 and 185. The rear of the pair of mating plates 180 is joined to the anchor brace 140. The front of the pair of mating plates 185 is rotatably connected to the rear plate 180. That is, the front plate is rotationally supported by the back plate. The back plate can be directly and fixedly attached to a front surface 143 of the anchor brace 140.

The rear plate 180 comprises a peripheral row of apertures 190 that will align with front plate apertures 195 of the front plate 185. A fastener can be inserted through each of two of the front plate apertures 195 positioned on opposing sides of the front plate 185, such as aperture 195A and 195B. The pair of pivot plates 155A and 155B and second set of strap brackets 160 are allowed to rotate freely until locked in with fasteners. Example fasteners include a bolt and nut.

In one embodiment, the first arcuate row of apertures of the back plate and first row of mating apertures of the front plate align and receive a fastener for locking the back plate and front plate into a fixed position. For example, a pin can be inserted through mated apertures so as to lock the front and back plate in fixed position. Pins can be placed into more than one set of aligned apertures in some embodiments.

In some embodiments, the back plate and front plate can be selectively rotated and fixed into various positions to allow for the pivoting sub-assembly (e.g., pair of pivot plates 155A and 155B, as well as the brace member 125 that couples with the seat 110) to be selectively rotated relative to a centerline of the anchor brace 140.

Figure 3:
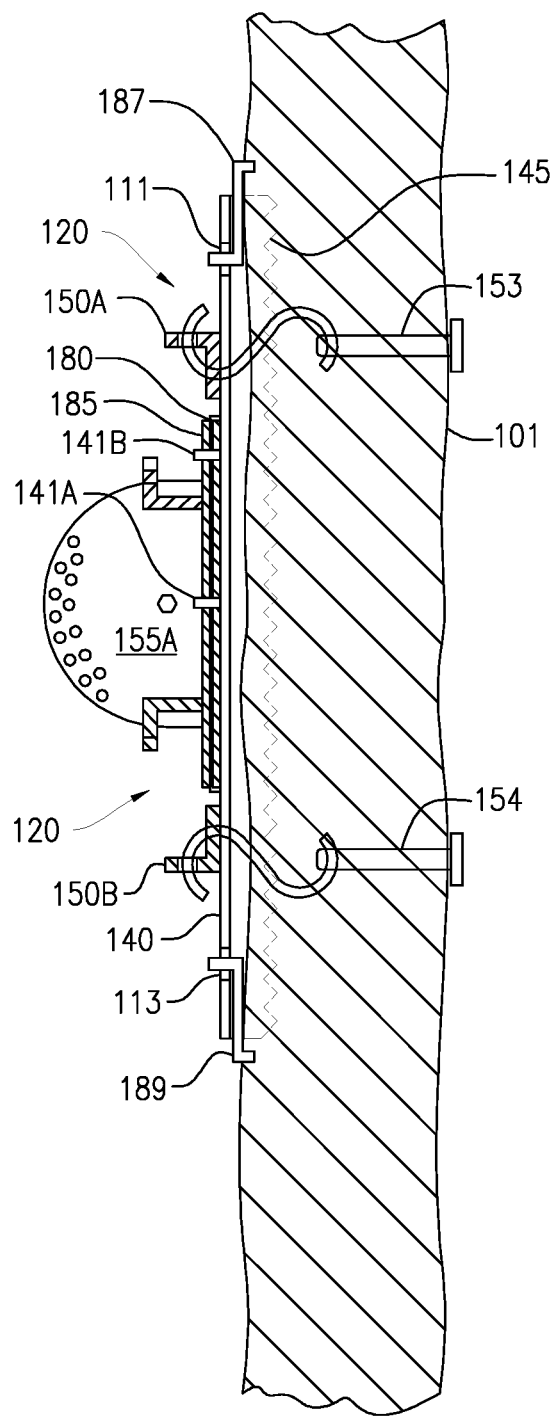
FIG. 3 is a cross sectional view of the rotating and pivoting assembly of FIG. 2 and anchor brace in combination, mounted to a tree.

The rotatability of the front plate 185 relative to the rear plate 180 allows for the anchor brace 140 to be set in place when joined to the tree, while the pair of pivot plates 155A and 155B and second set of strap brackets 160 are allowed to rotate freely until locked by use of a fastener. Example fasteners are illustrated in FIG. 3. For example, a fastener 141A is used to couple the front plate 185 and rear plate 180 in a fixed, but rotating relationship, while fastener 141B is releaseably associated with aligned apertures of the front plate 185 and rear plate 180 to secure the plates from rotating when a desired rotation position has been selected. In FIG. 1, an example fastener pin 141C is coupled through an aperture of the pivot arm 130 and an aperture of the pivot plate 155B. Though not show, the pin 141C extends through an aligned aperture on the pivot plate 155A on an opposing side.

Referring now to FIG. 3, in some embodiments the tree interface 120 comprises an anchor brace 140 that comprises a substantially U-shaped channel having saw-tooth edges 145. Note that in this illustration only pivot plate 155A is shown, with pivot plate 155B being removed. The saw-tooth edges 145 are configured to embed within the bark and/or pulp of the tree 101 to which the tree stand 100 is joined. These saw-tooth edges 145 are also referred to as gripping extensions, in some embodiments. The gripping extensions can include any number of configurations other than saw-tooth, such as studded, square, or flat.

In some embodiments the anchor brace 140 comprises an upper aperture 111 and a lower aperture 113 that are each configured to receive a hook, such as a J-hook.

In one embodiment, the anchor brace 140 can further be secured to the tree using hooks, such as J-hooks 187 and 189 that are inserted into the tree 101.

The anchor brace 140 receives a J-hook 187 into the upper aperture 111 a similar J-hook can be received through the lower aperture 113, shown as receiving J-hook 189. In some embodiments, a portion of the J-hooks 187 and 189 are embedded into the tree 101.

In operation, the anchor brace 140 is aligned substantially perpendicularly with a section of a tree, such as a branch or a tree trunk. Straps are threaded through each of the first set of strap brackets 150 and tightened to cinch the anchor brace 140 into the tree section. Next, the seat 110 can be leveled by any of: (1) pivoting the brace member 125 relative to the pair of pivot plates 155A and 155B; (2) rotating the brace member 125 using the pair of mating plates 180 and 185; (3) a combination of both (1) and (2).

The rotatability of the front plate 185 relative to the rear plate 180 allows for 360 degrees of rotational movement of the brace member 125, which allows the seat to be leveled and positioned, regardless of the angle of the tree section and anchor brace 140. Thus, the tree stand 100 can be used on tree branches that are substantially horizontal to the ground.

To be sure, the combination of the pair of mating plates 180 and 185 and the pair of pivot plates 155A and 155B are collectively referred to as a rotating and pivoting assembly. The pair of mating plates may be referred to herein as the rotating sub-assembly. The pair of pivot plates 155A and 155B may be referred to herein as the pivoting sub-assembly, and in combination with the pivot arm 130 that couples the seat assembly to the frame 105.

According to some embodiments, the device 100 can comprise a seat assembly that comprises the brace member 125 that couples with the seat coupler (pivot arm 130) of the pivoting sub-assembly (pair of pivot plates 155A and 155B). The seat 110 is pivotally coupled to a first end of the brace member 125 in some embodiments. The foot stand 115 is pivotally coupled to a second end of the brace member 125, in some embodiments.

In some embodiments, the seat material can comprise a textile material such as canvas or can include a perforated metal, just as an example. In other embodiments, the seat is a metal lattice or milled material.

Figure 4:
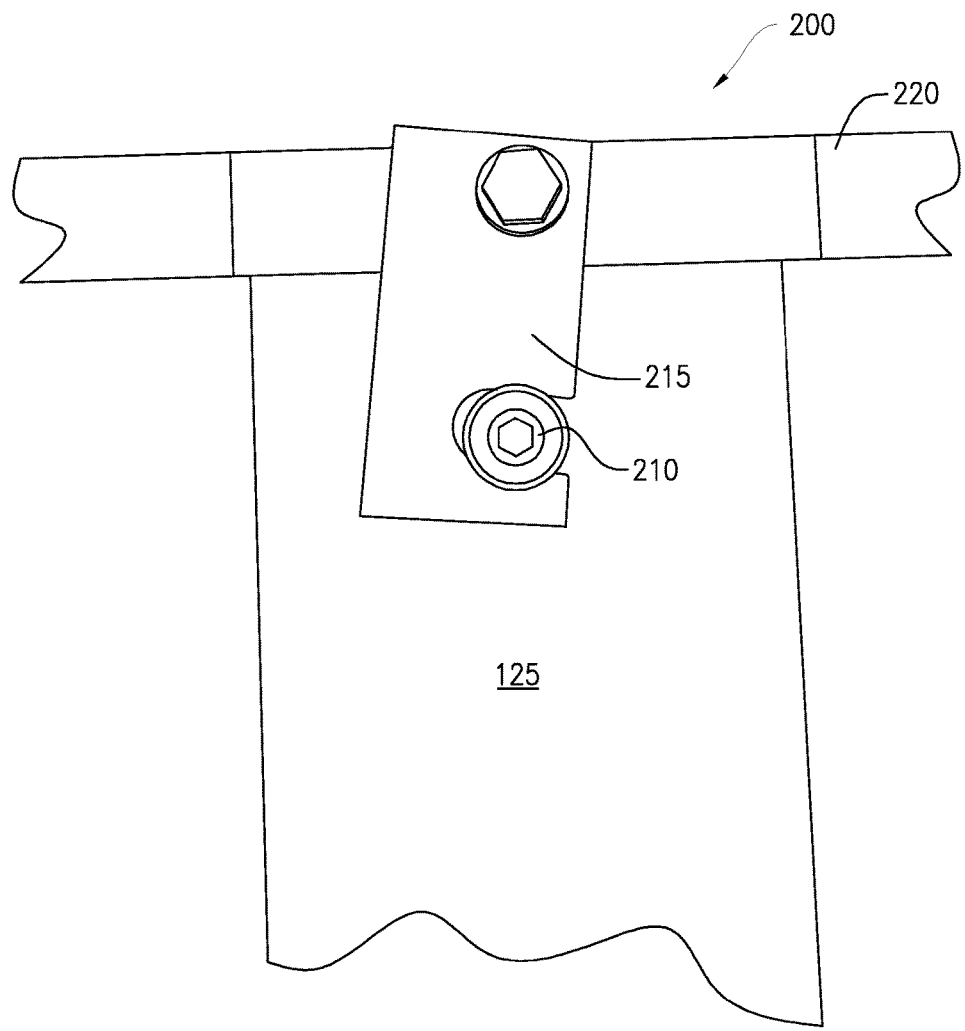
FIG. 4 is a close up plan view of a locking assembly of the seat assembly.

Turning now to FIG. 4, the seat comprises a pivoting interface 200 (also illustrated in FIG. 1) that comprises a hinge assembly 205. When the seat 110 is in an unlocked position the seat 110 pivots rearwardly. A locking member 215 is configured to mate with a protrusion 210 to lock the seat 110 in place. In some embodiments, the seat 110 is in a locked position (FIG. 1) with the locking member 215 engaged with the protrusion 210. When the seat 110 is in the locked position the seat 110 is pivoted forwardly and substantially perpendicular to the brace member 125. In one embodiment, the locking member 215 is rotatingly connected to a crossbar 220 of the seat 110.

Figure 5:
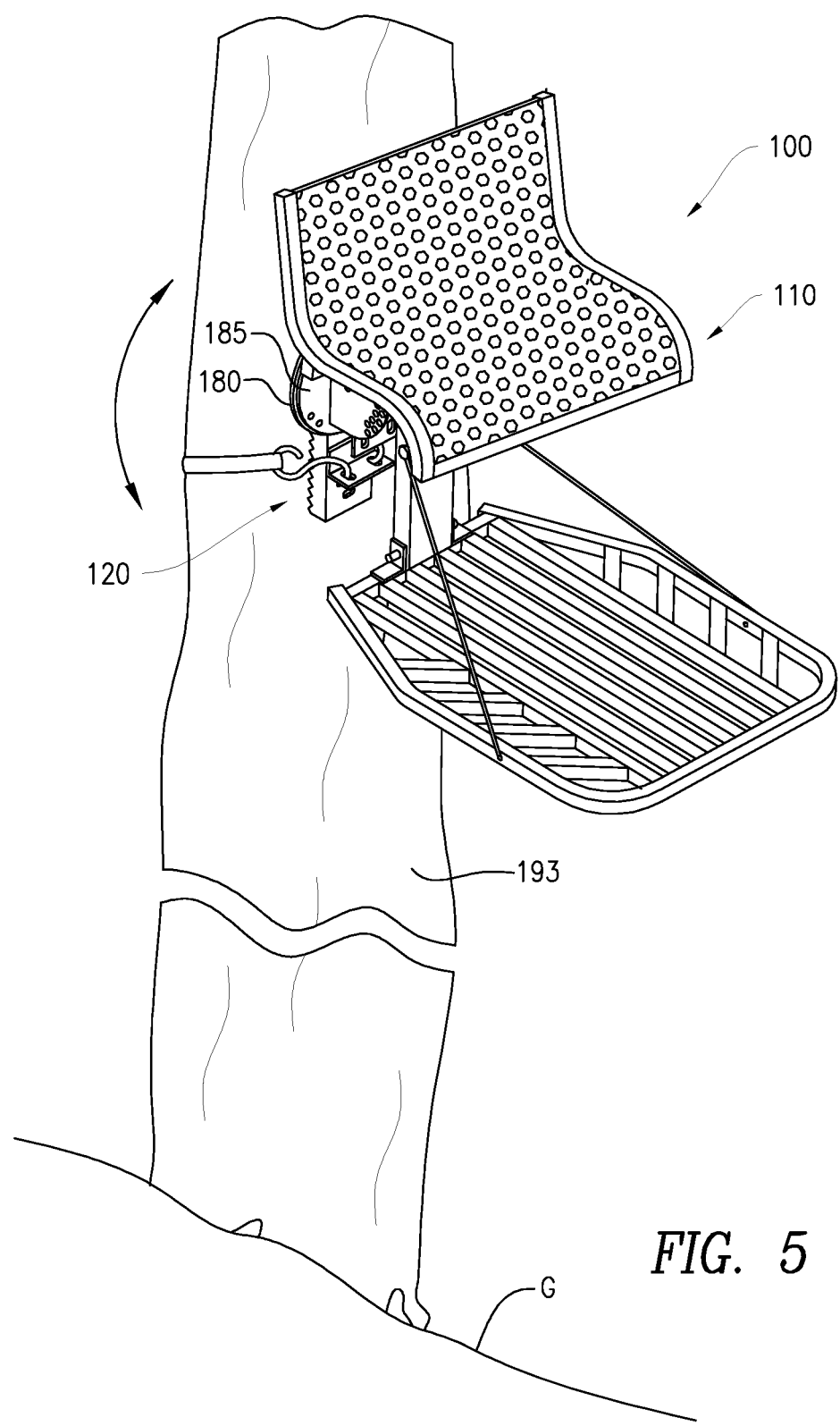
FIG. 5 is a perspective view of the example tree stand device mounted onto a crooked tree section and illustrating the example tree stand device being adjusted level to a ground surface.

FIG. 5 illustrates the tree stand 100 mounted to a crooked tree trunk 193. To be sure, the tree trunk is not directly linear and upright. Thus, the crooked tree trunk 193 is angled relative to a ground surface G. The tree interface 120 is coupled to the crooked tree trunk 193 and secured with straps. Once a plane has been established for the tree interface 120, the user can adjust the position of the seat 110 by rotating the front and back plates 185 and 180. This rotates the seat 110 on a plane that is parallel with the plane established by the tree interface 120. The user can pivot the seat 110 using the pivot plates as described above. Thus, once the tree interface 120 is securely coupled to the tree, the device is capable of movement on two separate planes, a rotating plane that is parallel to a plane of the tree interface 120 and a pivoting plane that bisects or is orthogonal to the tree interface 120.

Figure 6:
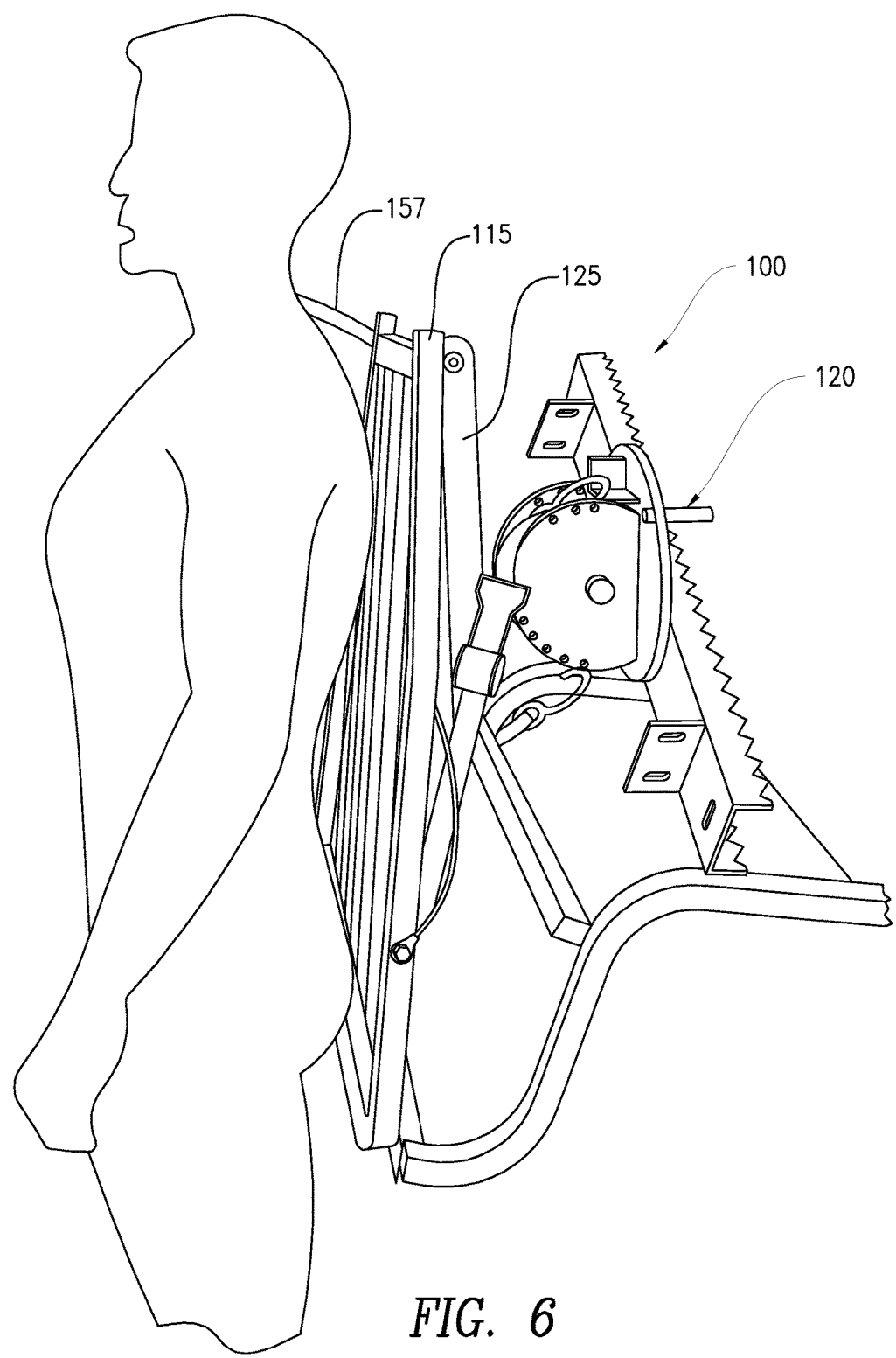
FIG. 6 is a side elevation view of the tree stand device of FIG. 1 in a stored configuration.

FIG. 6 illustrates the tree stand 100 in a folded configuration. In more detail, the foot stand 115 is folded back on to the brace member 125. The seat 110 is pivoted into the unlocked position. The tree interface 120 is rotated so as not to prevent the tree stand 100 from folding. Straps 157 attached to the seat 110 are looped so as to be worn around the shoulders of the user.

The seat assembly can be translated between a deployed position and a stored position. In the deployed position the seat 110 is in the sitting position and the foot stand 115 is substantially perpendicularly positioned relative to the brace member 125. In the stored position the seat 110 is in a transport position and the foot stand 115 is substantially flat against (or slightly angled relative to) the brace member 125.

Figure 7:
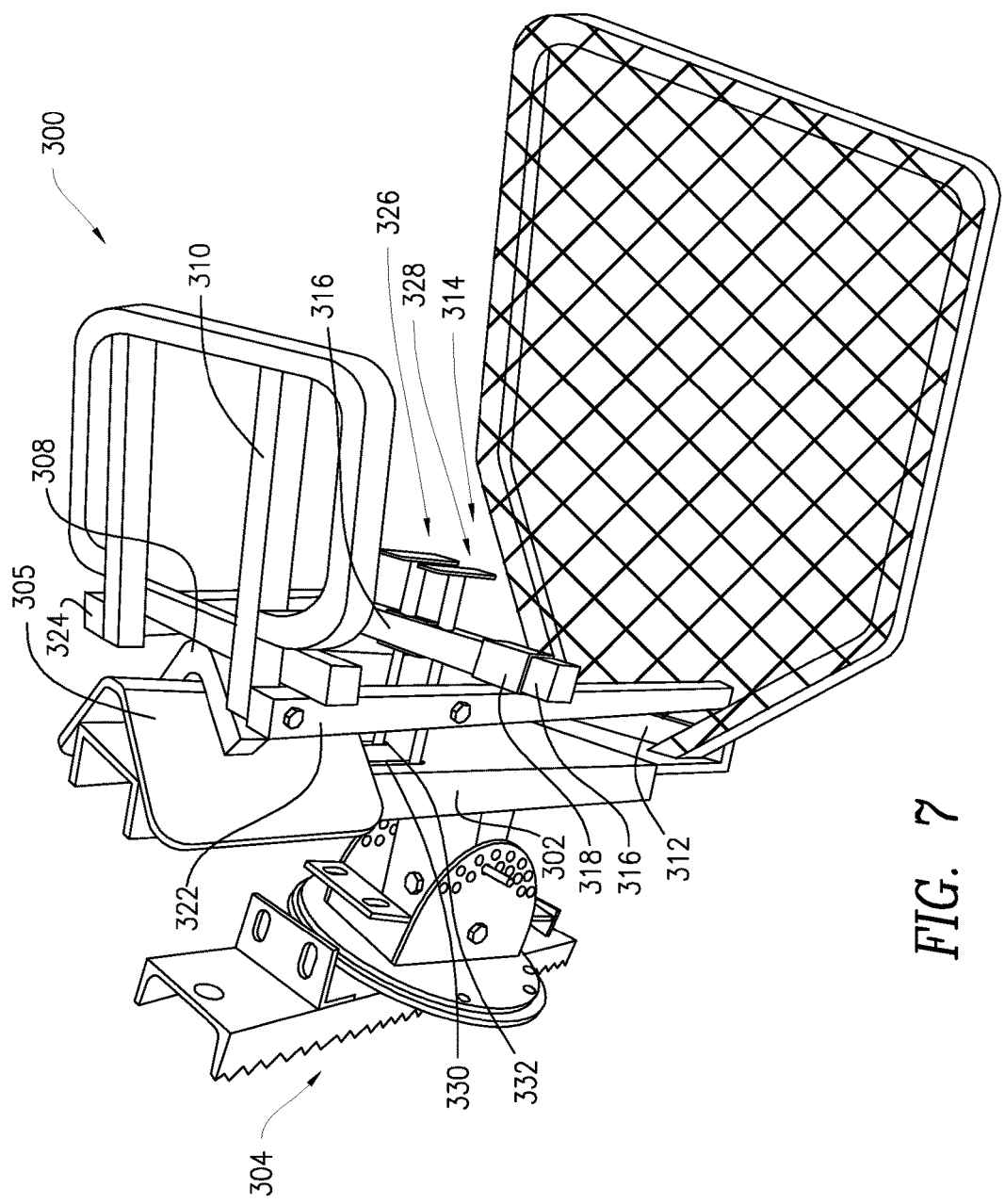
FIG. 7 is a perspective view of another embodiment of an adapter tree stand device that comprises a rotating and pivoting assembly and anchor bracket utilized to interface with tree stands of varying shape and size.
Figure 8:
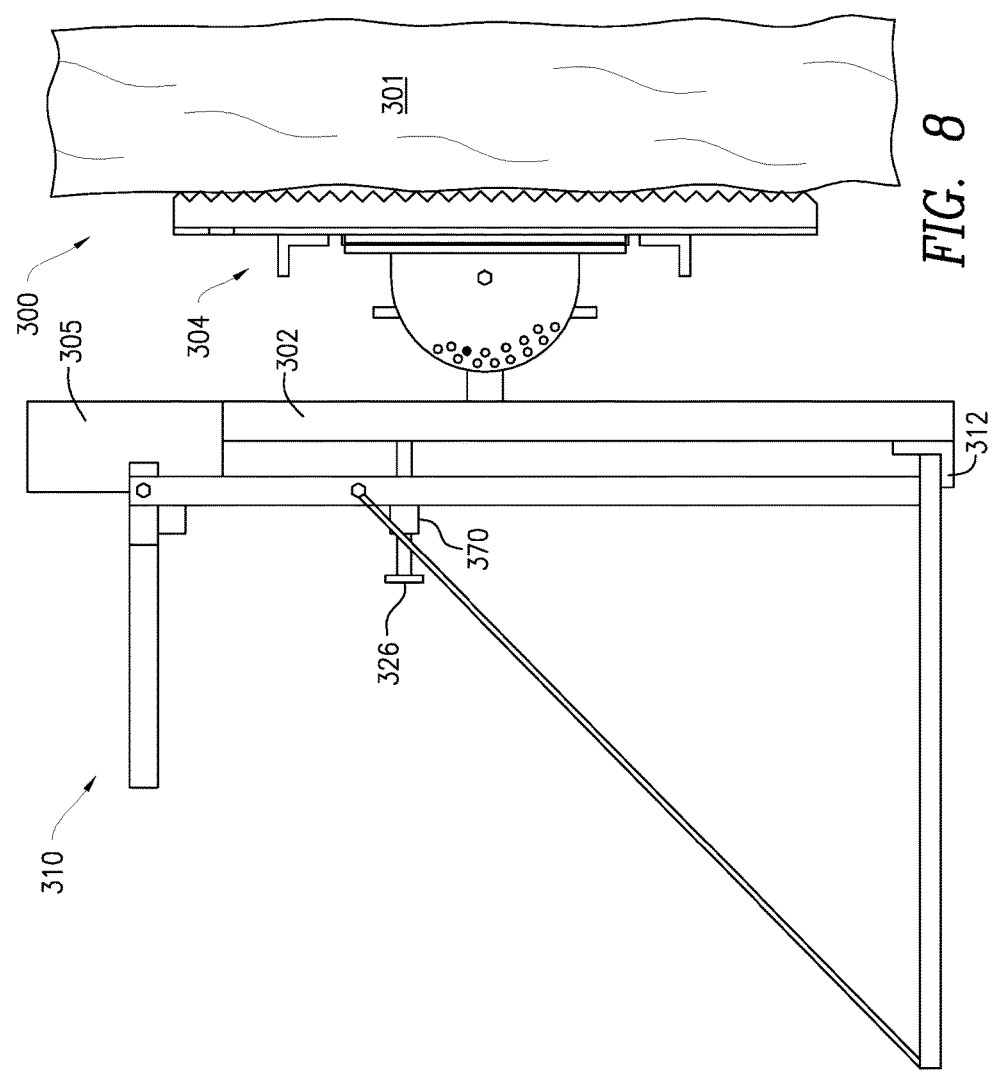
FIG. 8 is a side elevation view of tree stand device in combination with a tree stand, the adapter tree stand apparatus.

FIGS. 7 and 8 collectively illustrate another example adapter tree stand device 300 of the present disclosure. The adapter tree stand device 300 is constructed similarly to the device 100 of FIGS. 1-6 with the exception that the brace member 125 of FIG. 1 is replaced or modified to comprise an adapter embodiment, such as the adapter tree stand device 300 of FIGS. 7 and 8.

In some embodiments, the adapter tree stand device 300 is configured for use with tree stands or other tree stand related devices. More specifically, but not by limitation, the adapter tree stand device 300 is selectively adjustable for use on horizontal tree branches as well as vertical tree branches, as well as tree branches having angles between horizontal and vertical or a tree trunk. In some embodiments, the adapter tree stand device 300 is a lightweight device that can be placed into a folded configuration and carried on the back of a user with the use of straps. The adapter tree stand device 300 is configured to provide a mounting interface that allows virtually any tree stand device to couple to the tree stand adapter as if coupling to a tree trunk.

The adapter tree stand device 300 comprises a brace 302 and tree interface 304 that are similar to the brace member 125 and tree interface 120 of the devices described above relative to FIGS. 1-5. The device 300 is coupled to a tree 301 with the tree interface 304. Rather than utilizing a seat or pivoting seat at the terminal upper end of the brace 302, the adapter tree stand device 300 comprises an adapter interface 305 that is secured to the terminal upper end of the brace 302. The adapter interface 305 has a substantially A or V shaped profile although other profiles can be utilized such as rounded, square and so forth. Functionally, the adapter interface 305 provides a coupling area that mimics a tree trunk, such that a mounting surface or bracket 308 of an existing tree stand 310 can couple with the adapter tree stand device 300 as if the tree stand device 310 was being coupled to a tree. Thus, a wide variety of tree stands can be improved or can benefit from the multi-positional features of the tree interface 304 as described in the embodiments infra.

In some embodiments, the brace 302 is provided with a support plate or bracket 312 that is disposed below the adapter interface 305 and sometimes at an opposing terminal end of the brace 302 from the adapter interface 305. In some embodiments, the tree stand 310 is secured to the adapter tree stand device 300 by a locking assembly 314. In some embodiments, the locking assembly 314 comprises a locking bar 316 that engages with end brackets 318 and 320. The end brackets 318 and 320 are configured to slidingly attach to frame members 322 and 324 of the tree stand 310. The end brackets 318 and 320 are configured to move vertically along their respective frame member (either 322 or 324) to allow for selective positioning of the locking bar 316 when the locking bar 316 is coupled with the end brackets 318 and 320.

The locking bar 316 is coupled with the brace 302 using a pair of wingnut screws 326 and 328. In some embodiments, the brace 302 includes enlarged holes 330 and 332 that each receives one of the pair of wingnut screws 326 and 328, allowing the wingnut screws to pivot up, down, and in some embodiments, side-to-side. Thus, when the locking bar 316 is not perfectly aligned, the locking bar 316 can still be secured to the brace 302.

Figure 9:
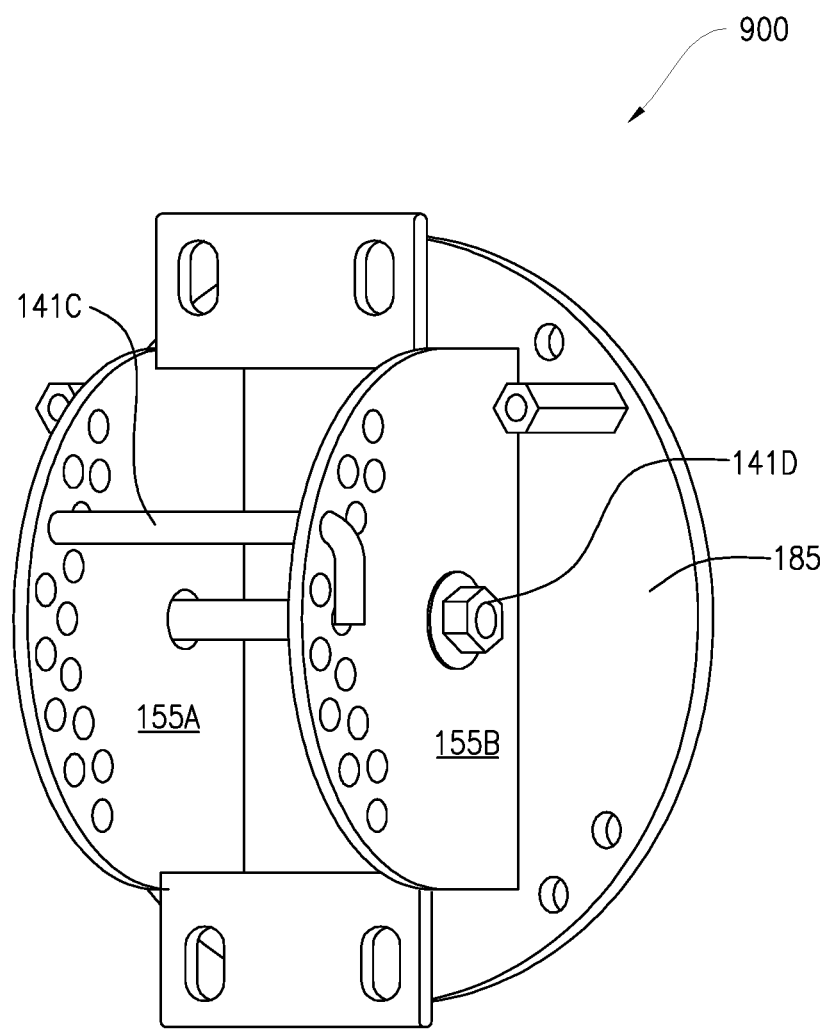
FIG. 9 is an alternative perspective view of an example rotating and pivoting sub-assembly that can be used with any of the embodiments of the present disclosure.

FIG. 9 is an alternative perspective view of an example rotating and pivoting sub-assembly 900 that can be used with any of the embodiments of the present disclosure, and illustrating the fastener pin 141C. In this embodiment, only the front plate 185 is illustrated. Another fastener 141D is utilized to couple the pivot plates 155A and 155B with the pivot arm 130 (illustrated in FIGS. 1 and 2A).

Figure 10:
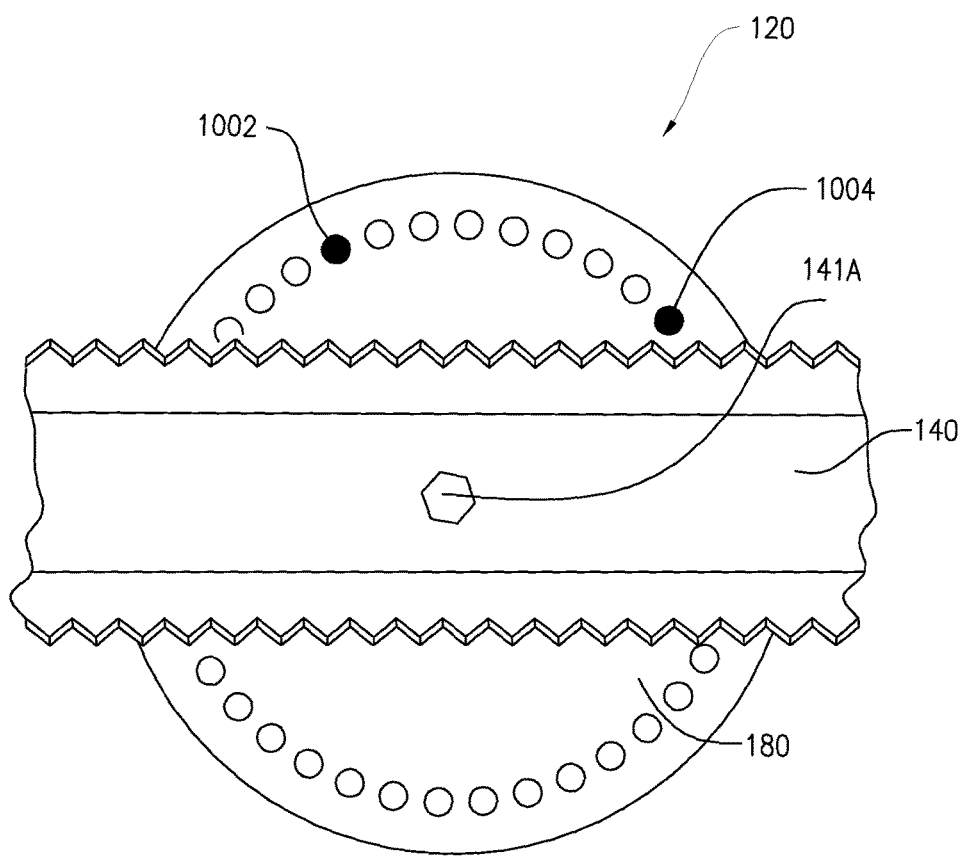
FIG. 10 is a rear close up view of the tree interface illustrating two fasteners that couple the rear plate to the front plate.

FIG. 10 is a rear close up view of the tree interface 120 illustrating two fasteners 1002 and 1004 that couple the rear plate 180 to the front plate. The fastener 141A that secures the rear plate 180 to the anchor brace 140 is also shown.

Figure 11:
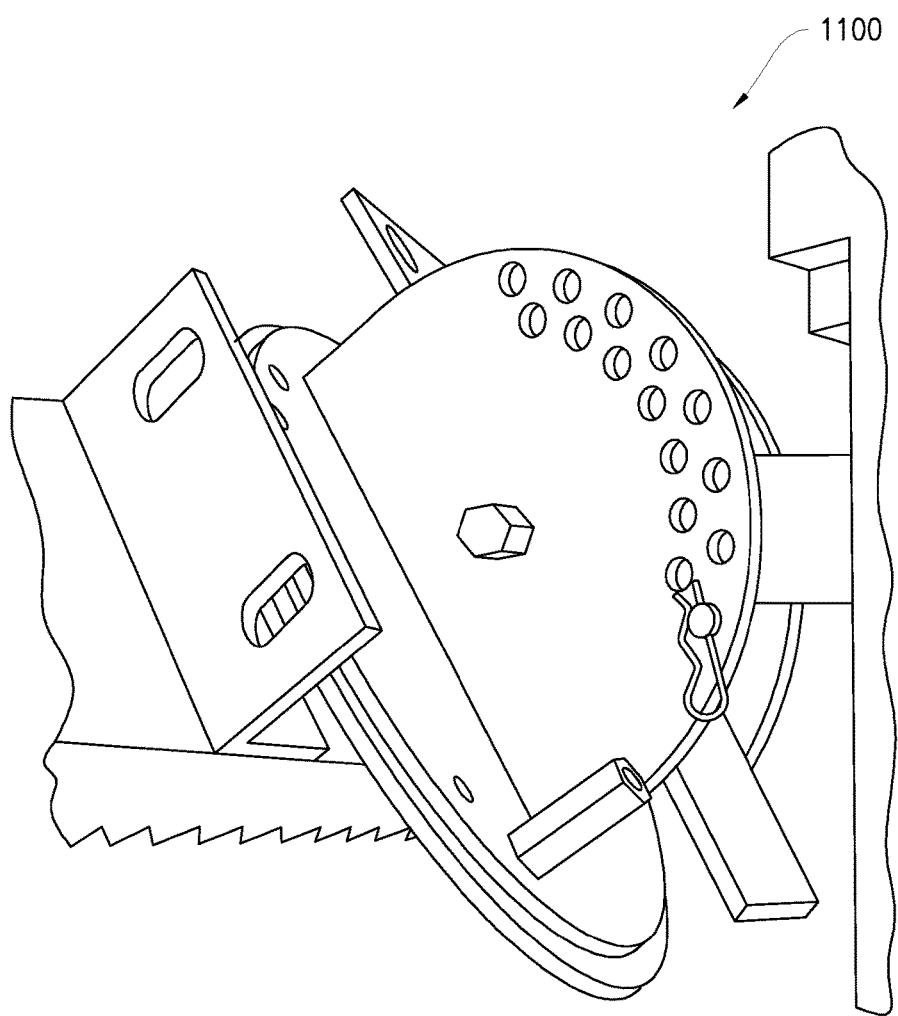
FIG. 11 is another perspective view of an example rotating and pivoting sub-assembly that can be used with any of the embodiments of the present disclosure.

FIG. 11 is another perspective view of an example rotating and pivoting sub-assembly 1100 that can be used with any of the embodiments of the present disclosure.

Figure 12:
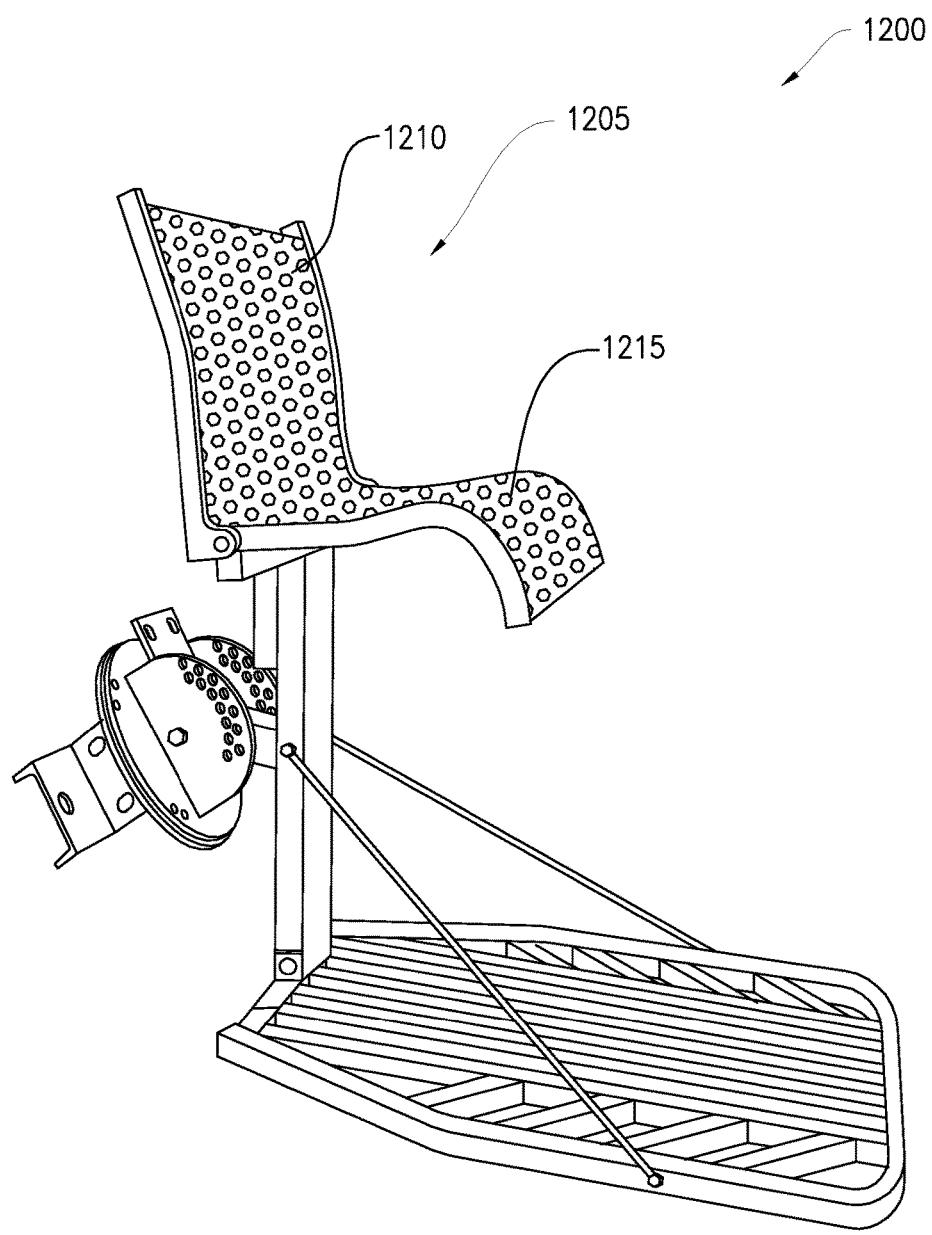
FIG. 12 is a perspective view of another embodiment of a tree stand device.

FIG. 12 is a perspective view of another embodiment of a tree stand device 1200 that is similar to the device of FIGS. 1-5 with the exception that the seat 1205 hinges. The seat 1205 has a top section 1210 and a bottom section 1215 that are in pivoting relationship to one another. The bottom section 1215 can be folded upwardly towards the top section 1210 in some embodiments, or vice versa.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, device, assembly, sub-assembly, component, and combinations thereof. Alternatively, in some embodiments the "means for" is expressed in terms of prose, or as a flow chart or a diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically or physically connected. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A tree stand apparatus, comprising:
    an anchor brace that is configured to interface with a portion of a tree; a rotating and pivoting assembly comprising:
    a rotating sub-assembly comprising:
    a back plate mounted to a front surface of the anchor brace; and a front plate rotationally supported by the back plate; a pivoting sub-assembly comprising:
    a pivot plate extending normally from a front surface of the front plate, the pivot plate comprising a plurality of securement apertures disposed in an arcuate pattern:
    a seat coupler comprising a pivot arm that is pivotally connected to the pivot plate; and wherein the pivoting sub-assembly rotates based on the rotation of the front plate relative to the back plate;
    a first pair of strap brackets, wherein a first of the first pair of strap brackets is mounted above the rotating and pivoting assembly and a second of the first pair of strap brackets is mounted below the rotating and pivoting assembly, wherein each of the first and second of the first pair of strap brackets comprise apertures that are disposed perpendicularly to the anchor brace, further wherein hooks of a strap engage with the apertures of either the first or second of the first pair of strap brackets to secure the tree stand to the tree;
    a second pair of strap brackets, wherein a first of the second pair of strap brackets is mounted above the pivoting sub-assembly and a second of the second pair of strap brackets is mounted below the pivoting sub-assembly, wherein each of the first and second of the second pair of strap brackets comprise apertures that face the front plate, further wherein hooks of another strap engage with the apertures of either the first or second of the second pair of strap brackets to bear a portion of the weight of the tree stand and a user disposed thereon; and
    a seat assembly that is coupled to the seat coupler, the seat assembly comprising a seat and a brace member that couples to the pivot plate through the pivot arm, wherein a fastener is inserted through at least one of the plurality of securement apertures in the pivot plate, further wherein the seat is hingedly coupled to an upper end of the brace member, a crossbar of the seat rests on a terminal end surface at the upper end of the brace member, the seat hinging backwards behind the brace member when stored, the seat being secured by a locking plate that rotatingly engages with a detent on a front surface of the brace member in a sitting position, the locking plate pivotally coupled to the crossbar of the seat.

2. The tree stand apparatus according to claim 1, wherein the anchor brace further comprises gripping extensions that extend from a back surface of the anchor brace, the gripping extensions being configured to embed in an outer surface of a tree.

3. The tree stand apparatus according to claim 1, wherein the anchor brace further comprises apertures on opposing ends of the anchor brace.

4. The tree stand apparatus according to claim 3, further comprising hooks that are configured to embed into a tree, wherein the anchor brace is coupled to the hooks through the apertures of the anchor brace.

5. The tree stand apparatus according to claim 1, wherein the back plate comprises a first arcuate row of apertures and the front plate comprises a first row of mating apertures that align with the first arcuate row of apertures and receive a fastener for locking the back plate and front plate into a fixed position.

6. The tree stand apparatus according to claim 5, wherein the back plate and front plate can be selectively rotated and fixed into various positions to allow for the pivoting sub-assembly to be selectively rotated relative to a centerline of the anchor brace.

7. The tree stand apparatus according to claim 5, further comprising a second arcuate row of apertures and a second row of mating apertures that are configured for alignment.

8. The tree stand apparatus according to claim 1, wherein the seat assembly can be translated between a deployed position and a stored position, in the deployed position the seat is in the sitting position and the foot stand is substantially perpendicularly positioned relative to the brace member, and in the stored position the seat is in a transport position and the foot stand is substantially flat against the brace member.

9. A tree stand apparatus, comprising: a rotating and pivoting assembly comprising:
a back plate configured to mount to a tree; and a front plate rotationally supported by the back plate; a pair of pivot plates extending normally from a front surface of the front plate;
a first pair of strap brackets, wherein a first of the first pair of strap brackets is mounted above the rotating and pivoting assembly and a second of the first pair of strap brackets is mounted below the rotating and pivoting assembly, wherein each of the first and second of the first pair of strap brackets comprise apertures are disposed perpendicularly to the anchor brace, further wherein hooks of a strap engage with the apertures of either the first or second of the first pair of strap brackets to secure the tree stand to the tree;
a second pair of strap brackets, wherein a first of the second pair of strap brackets is mounted above the pivoting sub-assembly and a second of the second pair of strap brackets is mounted below the pivoting sub-assembly, wherein each of the first and second of the second pair of strap brackets comprise apertures that face the front plate, further wherein hooks of another strap engage with the apertures of either the first or second of the second pair of strap brackets to bear a portion of the weight of the tree stand and a user disposed thereon; and a seat having a crossbar; a foot stand;
a brace member coupled with the pair of pivot plates through a pivot arm that extends perpendicularly to the brace member;
wherein the seat is hingedly coupled to an upper end of the brace member, the crossbar of the seat resting on a terminal end surface at the upper end of the brace member, the seat hinging backwards behind the brace member when stored, the seat being secured by a locking plate that rotatingly engages with a detent on a front surface of the brace member, the locking plate pivotally coupled to the crossbar of the seat; and further wherein the foot stand is hingedly coupled to a lower end of the brace member, the foot stand hinging forwardly to lay against the front surface of the brace member when stored.

10. The tree stand apparatus according to claim 9, wherein the rotating and pivoting assembly comprises saw-tooth members that grip an outer surface of the tree.

11. The tree stand apparatus according to claim 9, wherein the pivot arm comprises an alignment aperture that selectively couples with an arcuate row of apertures in the pair of pivot plates.

* * * * *